United States Patent [19]

Funkhouser et al.

[11] Patent Number: 5,449,536
[45] Date of Patent: Sep. 12, 1995

[54] METHOD FOR THE APPLICATION OF COATINGS OF OXIDE DISPERSION STRENGTHENED METALS BY LASER POWDER INJECTION

[75] Inventors: Merle E. Funkhouser, North Palm Beach; William J. Dalzell, Jr., Jupiter, both of Fla.

[73] Assignee: United Technologies Corporation, Hartford, Conn.

[21] Appl. No.: 995,420

[22] Filed: Dec. 18, 1992

[51] Int. Cl.⁶ ............................ B05D 1/12; B05D 3/06
[52] U.S. Cl. ................................ 427/597; 427/191; 427/554; 219/121.85
[58] Field of Search ............... 427/191, 554, 556, 597; 428/937; 219/121.65, 121.66, 121.84, 121.85

[56] References Cited

U.S. PATENT DOCUMENTS

| | | | |
|---|---|---|---|
| 4,101,713 | 7/1978 | Hirsch et al. | 428/937 |
| 4,200,669 | 4/1980 | Schaefer et al. | 427/596 |
| 4,300,474 | 11/1981 | Livsey | 427/192 |
| 4,427,447 | 1/1984 | Ramanarayahan et al. | 75/252 |
| 4,537,793 | 8/1985 | Kehrer et al. | 427/35 |
| 4,615,903 | 10/1986 | Miller | 427/554 |
| 4,644,127 | 2/1987 | La Rocca | 219/121 FS |
| 4,675,204 | 6/1987 | Nicoll et al. | 427/35 |
| 4,724,299 | 2/1988 | Hammeke | 219/121 L |
| 4,905,886 | 3/1990 | Kennedy et al. | 228/194 |
| 4,947,463 | 8/1990 | Matsuda et al. | 219/121.84 |
| 5,043,548 | 8/1991 | Whitney et al. | 427/596 |

FOREIGN PATENT DOCUMENTS

| | | | |
|---|---|---|---|
| 60-238472 | 11/1985 | Japan | 427/597 |
| 2-111863 | 4/1990 | Japan | 427/597 |
| 4-28883 | 1/1992 | Japan | 427/554 |

*Primary Examiner*—Terry J. Owens

[57] ABSTRACT

An oxide dispersion strengthened metal coating is applied to a substrate by positioning a laser spray apparatus over the substrate such that a laser in the spray apparatus forms a hot zone at a distance above the substrate sufficient to prevent the substrate from melting. An oxide dispersion strengthened metal powder coating material is injected into the hot zone to heat the coating material such that it will be in a plastic state when it impinges against the substrate. The coating material is then caused to impinge against the substrate to form a uniform coating on the substrate. The microstructure of the coating on the substrate is substantially identical to the coating material's microstructure before it is injected into the hot zone.

10 Claims, 6 Drawing Sheets fig.1 fig.2 fig.3 prior art fig.4 fig.5 fig.6 fig.7
prior art fig.8 fig.9
prior art fig.10

100X

METHOD FOR THE APPLICATION OF COATINGS OF OXIDE DISPERSION STRENGTHENED METALS BY LASER POWDER INJECTION

The invention was made under a U.S. Government contract and the Government has rights herein.

BACKGROUND OF THE INVENTION

1. Field of the Invention

This invention relates to the application of metal coatings to substrates, and particularly to the application of coatings of oxide dispersion strengthened (ODS) metals to a metal substrate, such as the application of a coating which is compatible with liquid and gaseous oxygen to a metal substrate. Such coatings rate suitable for utility in propulsion systems employing liquid oxygen fuel, such as in oxygen turbopumps, and for contact surfaces in liquid oxygen/gaseous oxygen (LOX/GOX) applications such as vacuum pumps for the manufacture of liquid oxygen. Further, the application of such coatings offers the opportunity for repair of substrates of wrought oxide dispersion strengthened metals.

2. Description of the Prior Art

New and better alloys are sought for the advancement of technologies in propulsion systems and associated hardware for aerospace activities. For example, a need exists for improved materials for contacting surfaces in high speed turbopumps for rocket engines and advanced engines which utilize liquid oxygen fuels. Limiting factors for the materials used in such applications include frictional heating, especially in an oxygen atmosphere. Various alloys have been tested for use and evaluated for their propensity to ignite due to frictional heating, and it has been shown that most alloys will ignite and burn when rubbed together at very high pressure and speed in an oxygen atmosphere. Selection of suitable alloys is also dependent upon the basic properties of the material, such as strength, creep resistance, oxidation resistance, coefficient of expansion, hardness, and ease of machinability to the appropriate configuration, etc. For this reason, the use of coated bearing and shaft surfaces has been attempted to prevent ignition of LOX/GOX incompatible substrates. One such choice of materials is the combination of Monel K-400 and silver, due to their good LOX/GOX compatibility.

Another material exhibiting appropriate properties, including LOX/GOX compatibility, is Inconel MA754, a nickel alloy which is dispersion strengthened by yttria ($Y_2O_3$). Prior to the present invention, however, no means had been found for the deposition of coatings of dispersion strengthened metals, particularly oxide dispersion strengthened nickel superalloys, on a substrate. Such metals are dependent upon the even distribution of finely divided chemically inert particles, usually oxides. These are added to the metal by powder-metallurgy techniques and are differentiated from precipitates which form by aging of metastable solid solutions. Wrought ODS alloys have very high strength and oxidation resistance at high temperatures, and have found use in the aerospace industry for components of gas turbine engines, etc. However, when such materials are subjected to temperatures at which liquification occurs, the dispersed oxides migrate to the surface, changing the microstructure of the alloy, and essentially altering the properties thereof.

SUMMARY OF THE INVENTION

The present invention relates to the application of a thin layer of an oxide dispersion strengthened nickel alloy, such as Inconel MA754, to a metal substrate, and as one example thereof, to the application of a coating of a LOX/GOX compatible material on a substrate. An yttria dispersed alloy is applied by a laser powder injection technique, wherein the focal point of the laser is above the surface of the substrate. The coating material is heated by the laser, but does not reach a temperature at which the oxide dispersion strengthening mechanism of the alloy is compromised.

DESCRIPTION OF THE PREFERRED EMBODIMENTS

Parts for high speed turbopumps for such application as oxygen turbopumps for the Space Shuttle, or vacuum pumps for liquid oxygen manufacture have very specific and demanding requirements, chief among which is LOX/GOX compatibility. This property is measured in terms of coefficient of friction, wear resistance, deformation under pressure, and propensity toward ignition and burning. At present, the baseline hydrostatic bearing materials are silver and Monel K-400, due to their LOX/GOX compatibility in combination. The rub characteristics of silver and Monel are minimal, due to the amount of deformation the relatively soft silver exhibits. This deformation, however, increases the gap clearance between the bearing surface and the corresponding contact surface, thereby decreasing performance by permitting leakage. In addition, the coefficients of thermal expansion of the silver and Monel may not be optimum, depending on the materials used in the housing and shaft of the pump.

To identify suitable materials for this application, promoted combustion and frictional heating tests were conducted by The National Aeronautic and Space Administration, who developed a frictional heating tester capable of evaluating the ignition properties of alloys in oxygen under rubbing conditions. A large number of alloys were evaluated in this tester and the mechanical energy (measured as the product of the contact pressure, P, and the surface linear velocity, v) required for ignition in oxygen at 6.9 Mpa (1000 psig) was determined for each alloy. Alloys containing large nickel compositions were found to have the least propensity toward ignition. [Stoltzfus, Benz, and Homa, "The Pv Product Required for the Frictional Ignition of Alloys", *Flammability and Sensitivity of Materials in Oxygen-Enriched Atmospheres; Fourth Volume*, ASTM 1040, Stoltzfus, Benz, and Stradling, Editors, American Society for Testing and Materials, 1989.]

It is known that most alloys will ignite and burn when rubbed together under sufficient pressure in an oxygen atmosphere, due to frictional heating. A measure of the propensity of metal alloys to ignite under these conditions was developed, measured in terms of the amount of mechanical energy applied to test samples during the frictional contact, or rubbing, process. Such mechanical energy is converted to thermal energy (frictional heat) during rubbing, which is highly dependent upon the value of the coefficient of friction, which in turn is dependent upon surface speed, contact pressure, temperature, surface characteristics and finish, and the presence or absence of surface oxidation. As a general ranking criteria for materials subject to rubbing conditions, the product of contact pressure and linear velocity, Pv, is a measure of both the propensity of metals and alloys to generate thermal energy and the thermal energy required to heat them to their ignition temperature.

The alloys tested are listed in Table I. Test samples consisted of pairs of hollow cylinders made from the same material and machined to the same diameter and wall thickness. Prior to testing, the samples were washed in dilute warm liquid detergent, rinsed in deionized water, and dried with nitrogen.

All alloys were tested in an oxygen atmosphere at 6.9 Mpa (1000 psi) and a rotational speed of 17,000 rpm. The normal load was applied at a rate of 31 N/s (7 lb/s) until the samples ignited or failed mechanically, or until the maximum loading was obtained. The samples were installed in a test chamber, which was sealed and pressurized with oxygen, and then vented to ambient pressure. This cycle was repeated twice to assure that all air had been expelled. The chamber was then pressurized with oxygen, and the drive motor switched on and set to the desired speed. The test samples were pressed together at the desired pressure, and pressure and speed measured. The mechanical energy (Pv) required for ignition of the tested alloys at 6.9 Mpa and 17,000 rpm is shown in Table II.

TABLE I

| ALLOY | WEIGHT PERCENT | | | | | | | | | | | | |
|---|---|---|---|---|---|---|---|---|---|---|---|---|---|
| | Ni | Fe | Cr | Cu | Al | Mo | Mn | W | Co | Nb | Ta | Ti | |
| Nickel 200 | 99 | .3 |  | .3 |  |  |  |  |  |  |  |  | |
| Inconel MA754[1] | 78 | 1 | 20 |  | .4 |  |  |  |  |  |  | .5 | a |
| Haynes 214[2] | 77 | 3 | 16 |  | 4 |  |  |  |  |  |  |  | |
| Inconel 600[1] | 76 | 9 | 15 | .1 |  |  |  |  |  |  |  |  | |
| Inconel MA6000[1] | 69 |  | 15 |  | 5 | 3 |  | 4 |  |  | 2 | 2 | c |
| Monel K-500[1] | 63 | 2 |  | 30 | 3 |  | 2 |  |  |  |  | .5 | |
| Waspaloy[3] | 58 |  | 21 |  | 1 | 4 |  |  | 16 |  |  | 2 | |
| Haynes 230[2] | 55 | 3 | 22 |  | .2 | 2 | .2 | 14 | 3 |  |  |  | |
| Inconel 718[1] | 53 | 19 | 19 |  | .4 | 3 |  |  |  | 5 |  | .9 | |
| Hastelloy X | 48 | 19 | 22 |  |  | 9 |  | .6 | 1 |  |  |  | |
| Inconel 706[1] | 42 | 36 | 16 | .3 | .4 |  | .4 |  | 3 |  |  | 2 | |
| Incoloy 903[1] | 38 | 42 |  |  |  | .9 |  |  |  | 15 | 1 | 3 | |
| Incoloy 909[1] | 38 | 42 |  |  |  |  |  |  |  | 13 | 5 | 2 | |
| 304 SS | 9 | 72 | 19 |  |  |  |  |  |  |  |  |  | |
| Incoloy MA956[1] |  | 74 | 20 |  |  |  |  | 5 |  |  |  | .5 | b |
| 440C SS |  | 82 | 17 |  |  | 1 |  |  |  |  |  |  | d | a: 0.6 Y$_2$O$_3$
b: 0.5 Y$_2$O$_3$
c: 1.1 Y$_2$O$_3$
d: 1 C

[1] Inconel MA754 ®, Inconel 600 ®, Inconel MA6000 ®, Monel K-500 ®, Inconel 718 ®, Inconel 706 ®, Incoloy 903 ®, Incoloy 909 ®, and Incoloy MA956 ®, are registered trademarks of INCO Alloys International, Inc.
[2] Haynes 214 ® and Haynes 230 ® are registered trademarks of Haynes International, Inc.
[3] Waspaloy ® is a registered trademark of United Technologies Corporation

TABLE II

| MATERIAL | Average Pv Product (W/m$^2$ × 10$^{-8}$) |
|---|---|
| Inconel MA754 | 4.10[a] |
| Nickel 200 | 3.05 |
| Haynes 214 | 3.05 |
| Inconel 600 | 2.50 |
| Inconel MA6000 | 2.28 |
| Waspaloy | 2.03 |
| Haynes 230 | 1.55 |
| Monel K-500 | 1.50 |
| Incoloy 903 | 1.30 |
| Hastelloy X | 1.20 |
| Inconel 718 | 1.12 |
| Incoloy 909 | 1.07 |
| 304 stainless steel | 1.04 |
| Inconel 706 | 1.00 |
| Incoloy MA956 | 0.68 |
| 440C stainless steel | 0.62 |

[a] No ignition

From Table II, it may be seen that the only material which did not ignite during the test sequence was Inconel Ma754, an oxide dispersion strengthened nickel alloy containing yttria, Y$_2$O$_3$. Oxide dispersion strengthened alloys are noted for exceptional high temperature strength and creep resistance, and this nickel alloy is particularly noted for its high melting point, microstructural stability, and resistance to thermal fatigue. Although bearings, shafts, etc., could be fashioned from wrought oxide dispersion strengthened alloys, the relative cost of shaping such hard materials encouraged consideration of the application of coatings thereof, and specifically coatings of Ma754, to a base material. However, when such materials are subjected to temperatures at which liquification occurs, the microstructure of the alloy is altered, changing the properties thereof. Accordingly, attempts to apply oxide dispersion strengthened metals as a coating have previously been unsuccessful.

In accordance with the present invention, Ma754 powder is injected into the path of a pulsed (or continuous) YAG laser, focused at a point above the surface being coated so as to avoid melting or overheating of the surface itself, and the powder is heated to a plastic state and deposited upon a substrate, such as a hydrostatic bearing or shaft. This produces a highly dense and uniform coating of Ma754 alloy, which has LOX/GOX compatibility, a low coefficient of friction, and negligible wear deformation. This process may be automated and scaled to meet manufacturing requirements. In addition to application to bearings and shafts, such coatings have other applications, such as LOX/GOX brush seals, LOX turbopump knife edge seals, and the repair of ODS metal substrates by the addition of ODS metal to the surface thereof. Although the following example is presented in terms of LOX/GOX compatible coatings for turbopumps, it is to be recognized that the invention is not limited to this utility, but has much broader application.

Figure 1:
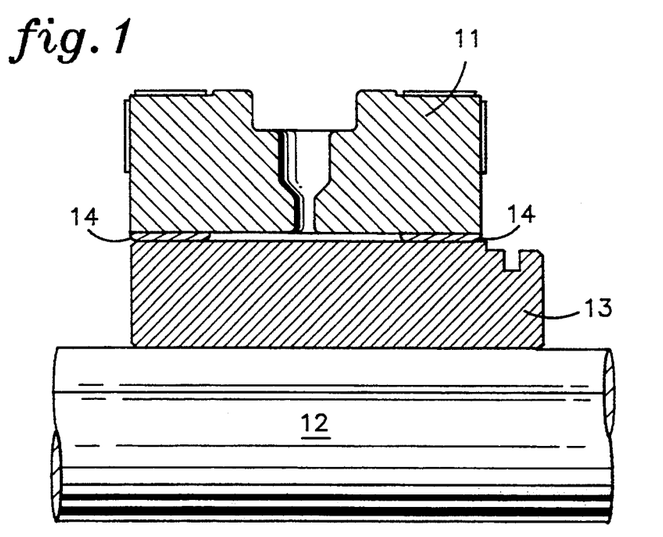
FIG. 1 illustrates a state-of-the-art hydrostatic bearing configuration for an oxygen turbopump.

A state-of-the-art hydrostatic bearing configuration for an oxygen turbopump is shown in FIG. 1. Bearing 11, made of a conventional bearing material, such as Monel K-400, Monel K-500, or stainless steel, cooperates with a shaft, 12, which may be made from a high strength nickel or steel alloy which is suitable for cryogenic applications, such as A-286 iron alloy, Inconel 718, IN-100, or Waspaloy nickel base alloys. Such materials are not LOX/GOX compatible, however, and require protection from the environment in which they are to be used. This may be provided by the presence of a LOX/GOX compatible sleeve or runner, 13, which is normally press fit or mechanically attached to the shaft, as illustrated in FIG. 1, which is made of a LOX/GOX compatible material, such as Monel K-400 or Monel K-500, which are low strength copper-nickel alloys. The runner, which is in frictional contact with the bearing, rubs against a silver coating, 14, applied to the bearing surface by conventional electroplate techniques, when the bearing material is other than sterling silver. Alternatively, a hydrostatic bearing configuration may be utilized without a runner, wherein the contacting surfaces of the bearing and the shaft are coated so as to form a LOX/GOX compatible combination, such as by coating one with silver and the other with chromium.

Figure 2:
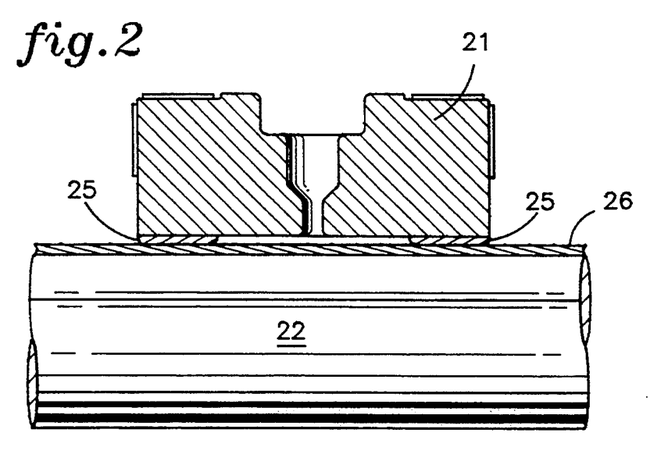
FIG. 2 illustrates an improved hydrostatic bearing configuration in accordance with the present invention.

FIG. 2 illustrates a hydrostatic bearing configuration using a coating of Ma754, applied in accordance with the present invention as the LOX/GOX compatible contact surface between the bearing, 21, and the shaft 22. Here, a coating, 25, of an ODS alloy has been applied to the surface of the bearing, and a similar coating, 26, of the same alloy has been applied to the surface of the shaft. Alternatively, a runner of the ODS alloy could be used in place of coating the shaft, but the use of a runner entails additional manufacturing steps, costs, and possible quality problems.

Figure 3:
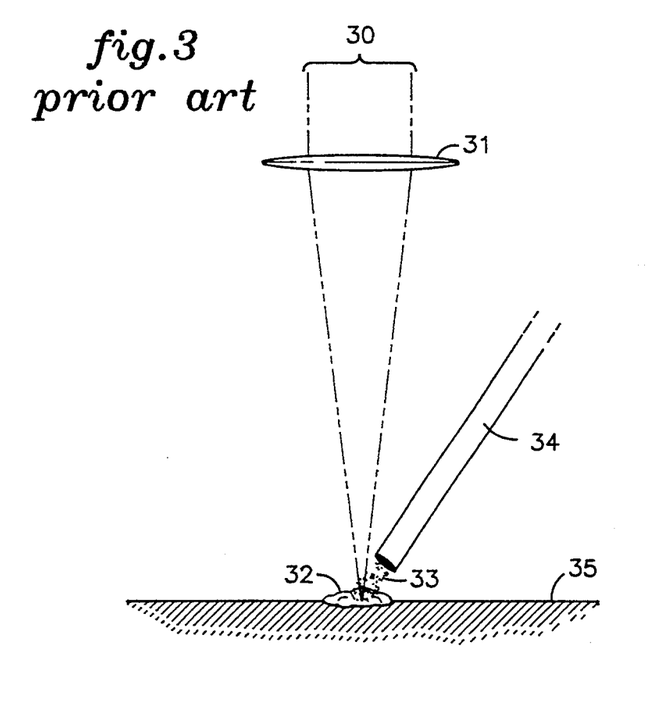
FIG. 3 illustrates a schematic of a conventional laser powder injection focusing arrangement.
Figure 6:
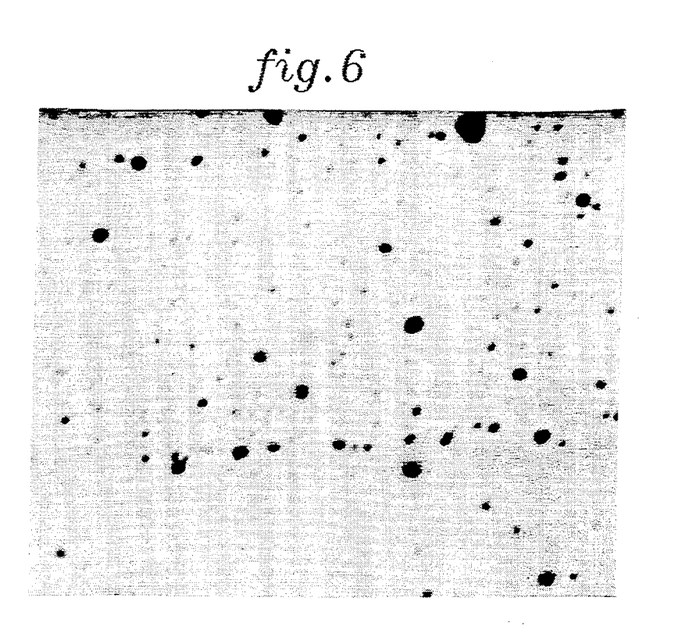
FIG. 6 is a backscatter photomicrograph of oxides (black) in a forged Inconel MA754 metal matrix (gray).
Figure 7:
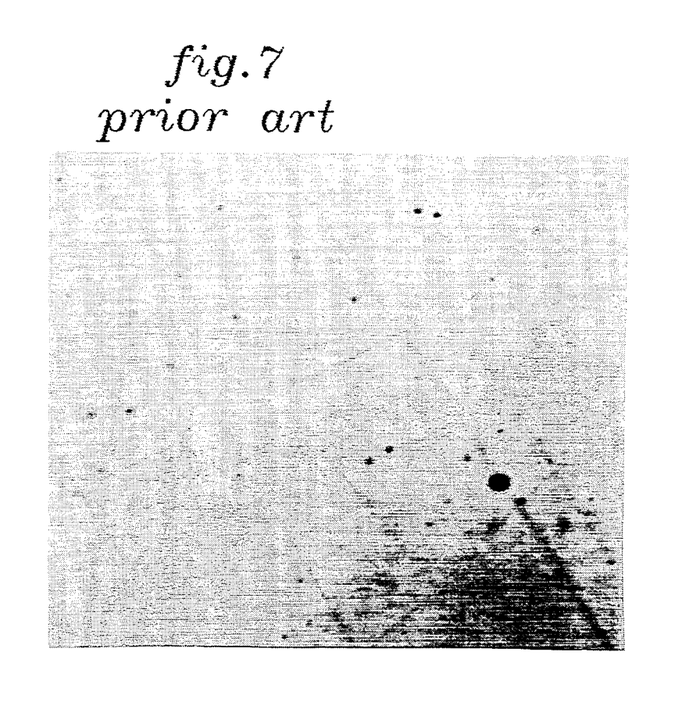
FIG. 7 is a backscatter photomicrograph of Ma754, as deposited upon a substrate by conventional laser cladding techniques.
Figure 9:
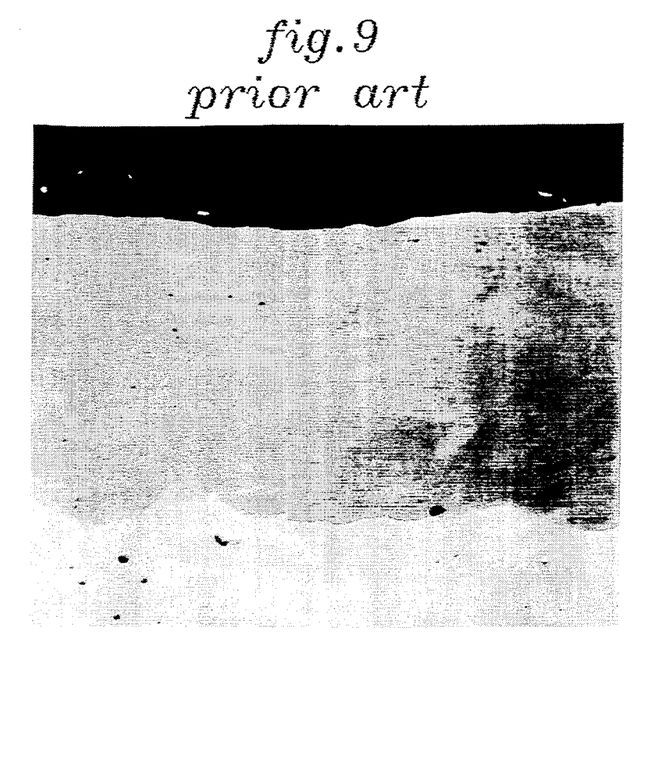
FIG. 9 is a cross sectional view of a layer of Ma754 as deposited upon a substrate by conventional laser cladding techniques.

In a conventional laser spray powder application, or laser cladding operation, a focusing arrangement for which is illustrated schematically in FIG. 3, the high intensity laser beam, 30, is focused by a final focal lens, 31, on substrate 35, to melt a small volume of surface metal, forming melt pool 32, and the powdered metal alloying material, 33, which is injected by the powder injector, 34, melts in this pool, and is dispersed therein, altering the composition of the surface layer in the desired manner. Relative movement of the laser beam and the workpiece causes the molten material to rapidly chill, which can result in hardening due to phase changes in the solid metal, and a cross section of the coated or clad substrate as shown in FIG. 9. FIG. 7 is a backscatter photomicrograph of the result of depositing an ODS alloy using conventional laser processing. The oxides, as shown by this figure, have migrated and segregated, producing a nonuniform distribution of oxides, which microstructure is unacceptable for use in a LOX/GOX environment. In comparison, FIG. 6 illustrates the oxide dispersion of the same alloy, in a forged form, at the same magnification, showing the relatively large number of oxide particles present, and their uniformity of size and distribution.

Figure 4:
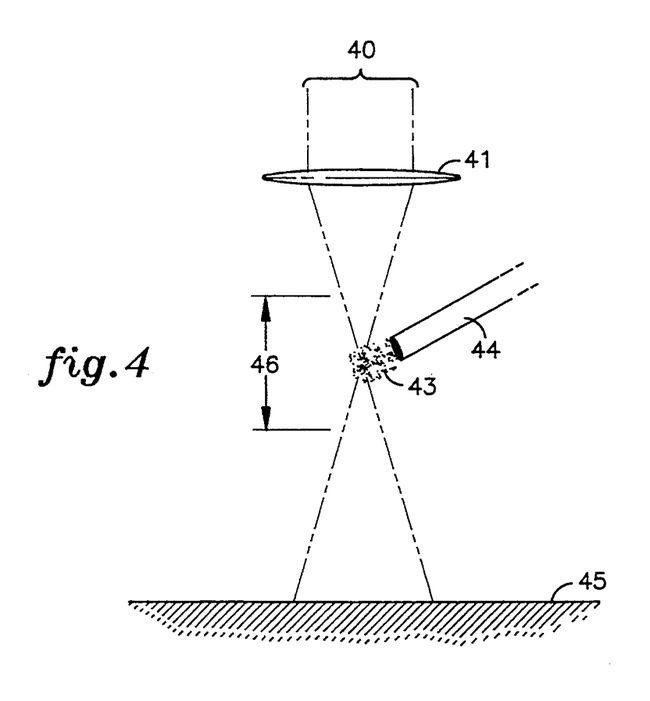
FIG. 4 illustrates a schematic of the laser powder injection focusing arrangement of the present invention.

In conventional laser cladding apparatus and procedures, the laser beam and the powder exit the laser spray nozzle essentially coaxially, and have the same focal point. However, in the present invention, the focal point is not on the surface of the article as it is in conventional practice, but at a point slightly above the surface of the article, as shown in FIG. 4. In this instance, the laser beam 40 is focused by a final focusing lens, 41, at a point above the substrate 45, thus forming a defocused hot zone 46, into which the powder 43 is injected via powder injection means 44. In this manner, with appropriate control of laser beam intensity and focus, in conjunction with choice of powder size and flow rate, we have been able to heat the powder particles sufficiently that they are in a plastic state at the point of impact upon the substrate, but not to the point at which the microstructure of the coating material is altered. That is, the primary matrix alloy microstructure is unchanged by the rapid laser heating of the powder, followed by the sudden quenching resulting from deposition on a relatively cool substrate, which acts as a heat sink.

The actual state of the powder at its highest temperature is not fully understood, but it is believed that the powder is fully melted, and resolidified at such a rapid rate such that insufficient migration or coalescence of the oxide particulates occurs to affect the microstructure of the material. Alternatively, it is considered possible that the surfaces of individual powder grains are subjected to melting while the core, or central portions of the powder grains remain in a semi-solid, or solid state, such that boundaries between the individual powder grains coalesce. In either event, there are no longer any boundaries between the individual powder grains as deposited. For purposes of this, application, this process shall be referred to as non-equilibrium melting.

The capability to achieve this result is dependent upon a large number of factors, chief among which are the laser intensity, the powder composition and size distribution, the powder flow rate, the distance of the focal point above the substrate, and relative, motion of the laser and the workpiece. While the present invention permits the deposition of ODS metals on any substrate to which the metal will bond, it is noted that the bonding is not a diffusion bond, or a complete metallurgical bond, since the surface layer of the substrate is not subjected to substantial or complete melting. The coatings which are obtained, however, are very uniform, of high density (approaching 100 percent of theoretical), and from about 0.0001 inches to about 0.0070 inches in thickness, per coating pass. Moreover, multiple coating layers may be applied very rapidly to achieve any desired thickness of the coating, since no heat treatment of the substrate, or of the coating, is necessary to smooth, anneal, or densify the resultant layers of ODS metal. Further, it is envisioned that one is able to alter the composition of the individually applied layers of metal, permitting the establishment of gradients or variations of composition from the substrate to the outer surface of the coating, e.g. oxide glazing.

Figure 5:
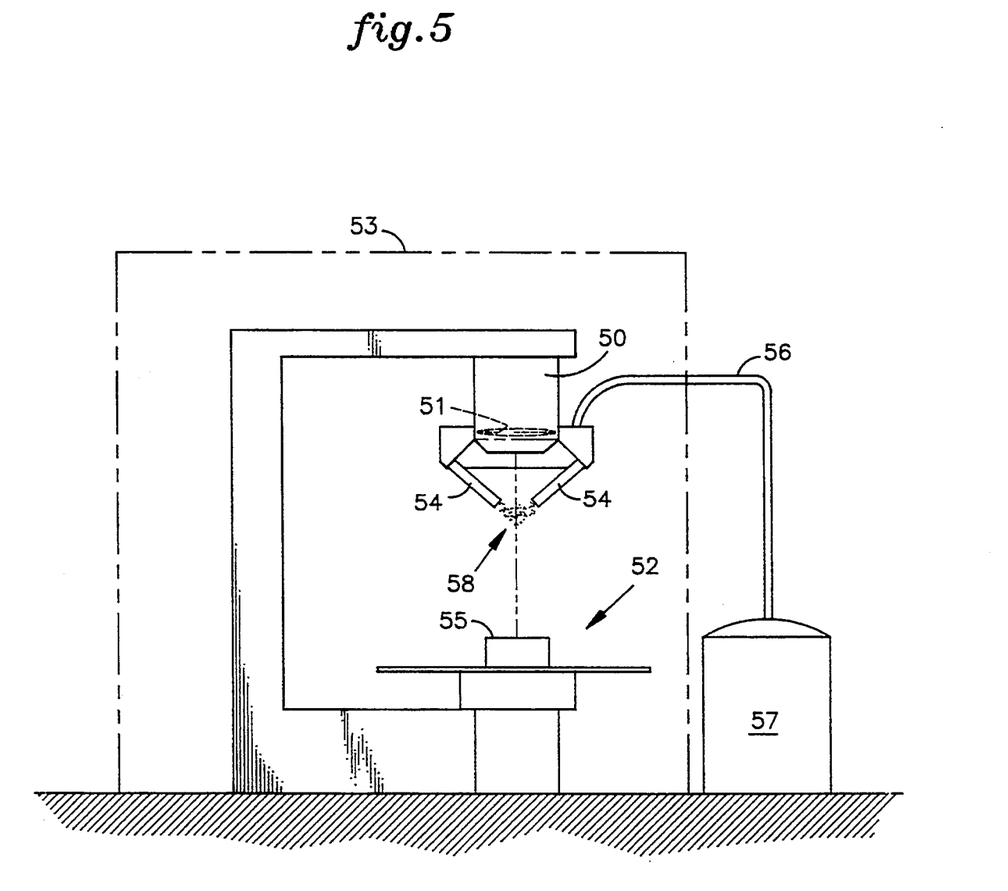
FIG. 5 illustrates a schematic of a laser powder injection coating apparatus suitable for producing the LOX/GOX compatible coatings of the invention.

An apparatus suitable for the present invention is schematically presented in FIG. 5, wherein target 55 is positioned on robotic work station 52, within an appropriate laser safety enclosure 53. Laser source 50, including focusing lens 51, is positioned away from the target at a desired distance, in proximity to powder injectors 54, which are in turn fed by line 56 from powder source 57. The equipment is situated in such a manner that the ODS metal powder from the powder source 57 is injected into a defocused hot zone of the laser beam, 58, at a preselected distance from the target surface. The powder, which may be from about minus 100 to about plus 325 mesh in size, and is preferably from about minus 100 to plus 200 mesh (75 to 150 microns) and is preferably carried at high speed in an inert gas stream, such as argon, is heated and virtually simultaneously deposited on the target, for example a hydrostatic bearing shaft, which is in motion relative to the laser source. The work station is preferably robotic, with from three to six degrees of freedom, and may be powered hydraulically, electrically, pneumatically, or by some combination of the same. The robotic work station may be computer controlled in conventional manner. It is noted that the work piece may, alternatively, remain stationary, while the laser and powder injection nozzles move relative to the target. The laser may, for example, be a pulsed YAG laser, although continuous lasers are also useful in the present invention, providing that the laser is metallurgically compatible with the alloy to be deposited. Various types of laser may be used, provided they have focusing capability, and may be used in conjunction with a typical powder spray nozzle. It is critical that the laser be focused in such a manner that it does not focus directly upon the substrate, since melting of the surface is specifically to be avoided. A secondary laser or other means may be utilized for alignment purposes. The laser work parameters are computer controlled, and are linked to the robotic work station so as to achieve an optimized high reliability coating.

The spray nozzle is selected so as to provide a continuous flow of particles of the metal powder to a defocused hot zone, at a point slightly distant from the substrate being coated, as illustrated in FIG. 4. The injected powder is heated by the laser, to a temperature at which the powder is in a plastic state, or to a state of nonequilibrium melting, in which state the dispersion of oxide particles in the powder is not effected. The coating material, in the form of finely divided powder in a plastic state, carried in a rapidly moving stream of inert gas, then impacts upon the relatively cold surface of the target, and is distributed thereupon. The rapid quenching affect (estimated to be at least $10^{4°}$ F. per second) of impact upon the surface insures that the dispersed oxide particles are neither dissolved or redistributed in the matrix metal. Since the powder is subjected to non-equilibrium melting, and the substrate is not heated by the laser to the extent that melting of the surface layer occurs, the deposited layer does not alloy with the substrate, but coats the surface thereof. The focal point of the laser may be from about 0.10 inches to about 1.0 inches above the surface of the work piece. The flow rate of powder may be controlled by control of the carrier gas, such as argon, to deposit the powder at a rate of from about 8 grams/minute to about 20 grams per minute.

Example

Frictional heating specimens, comprising A-286 steel, simulating a space transportation main engine oxidizer turbopump shaft, were coated with a coating of Ma754 alloy having a thickness of from 0.025 to 0.035 inches prior to machining. After machining, the final coating thickness ranged from 0.019 to 0.029 inches. The specimens were cleaned with an alcohol wipe, placed in a rotating table clamp, and the table and laser computers were programmed for speed of relative motion. The laser parameters were programmed, and the focal height of the laser beam was set with calipers. A powder source of Ma754 alloy, comprising particles ranging in size from 75 to 150 microns, and having a composition of 20 weight percent chromium, 0.5 percent titanium, 0.3 percent aluminum, maximum 1.0 percent iron, 0.6 percent dispersed yttria, and the balance nickel, was provided to a powder feeder, feed line, and powder injection means. The powder was preheated for 18 hours to eliminate all moisture from the powder prior to injection. A pulsed YAG laser, having a power of 400 watts, operating at 150 watts and a pulse width of 2.0, was aligned with the specimen as a target, positioned in cooperative relationship to the powder injectors, and focused so as to have a focal point approximately 0.3 inches above the specimen. A secondary ruby laser was used for alignment purposes. The powder injectors were then focused so as to deliver a flow of argon gas carrying the Ma754 powder, at a flow rate of 8 grams per minute to the defocused hot zone of the laser. The gas flow and powder feed were then started, followed by powering of the laser and the rotating work table, to move the specimen relative to the laser and powder stream, and a coating of the MA754 was evenly applied, having a calculated thickness of 0.003 inches per pass. The process was repeated until the final thickness of coating desired was achieved.

After the completion of the coating process, the specimens were cleaned with alcohol, and measured at 5 points to evaluate coverage and coating thickness. It was found that a coating density of almost 100 percent was achieved, with a coating thickness of 0.025 to 0.030 inches. Frictional heating ignition specimens were prepared and rubbed against each other. A successful test was achieved, in that ignition of the pieces did not occur.

Figure 8:
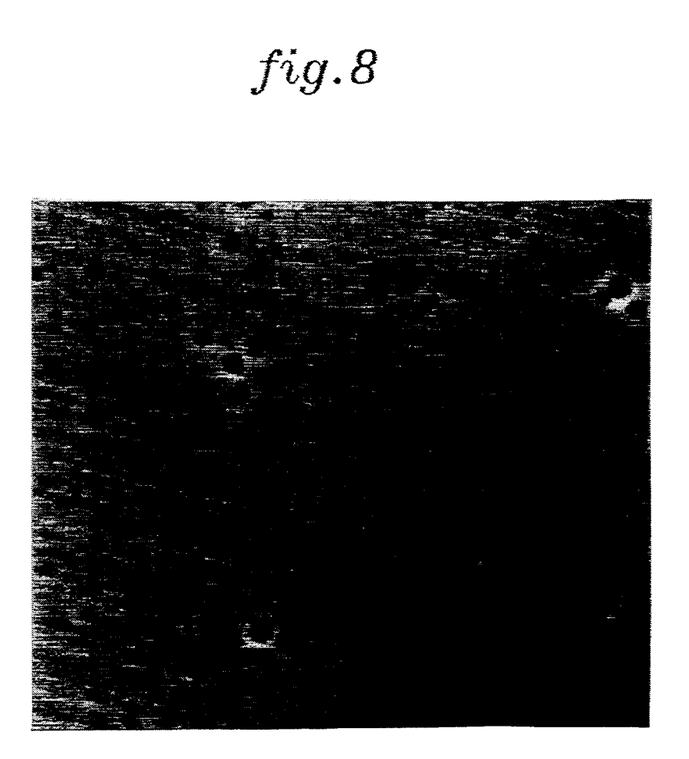
FIG. 8 is a backscatter photomicrograph of Ma754, as deposited upon a substrate in accordance with the present invention.
Figure 10:
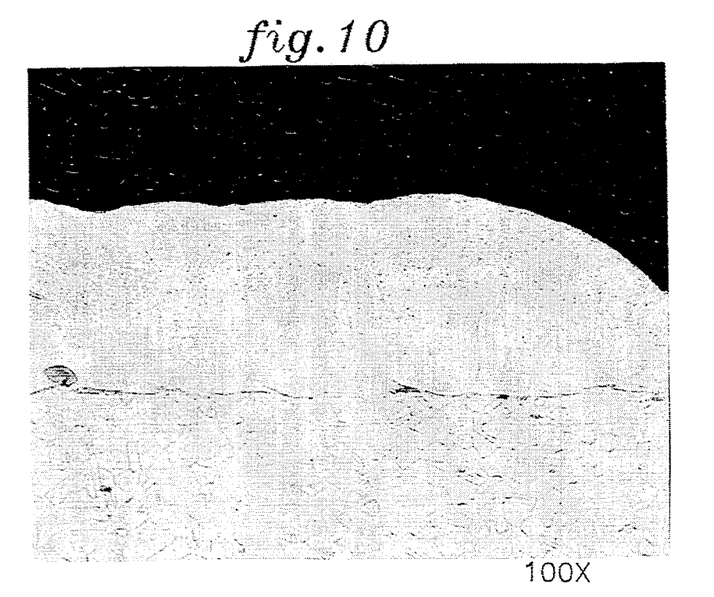
FIG. 10 is a cross sectional view of a layer of Ma754 as deposited upon a substrate in accordance with the present invention.

FIG. 8 is a backscatter photomicrograph of the coating as applied, illustrating that the relatively uniform dispersion of yttria has not been destroyed by the laser coating process employed, and that the oxides are relatively evenly and uniformly dispersed in the coating. FIG. 10 is a cross section of a coated substrate as prepared in this example. A comparison of the results shown in cross section, in FIGS. 9 and 10, illustrates the difference in bonding achieved, and to some degree the extent of oxide dispersion strengthener present. A more telling comparison may be made between FIGS. 6, 7, and 8, wherein the wrought alloy Ma754 (FIG. 6), the conventionally laser coated alloy Ma754 (FIG. 7), and Ma754 coated in accordance with the present invention (FIG. 8), respectively, are shown in backscatter photomicrographs to illustrate the presence (or absence, in FIG. 7) of the dispersion strengthening oxide phase.

In addition to the Ma754 alloy exemplified above as a coating material, other dispersion strengthened metals may be employed, such as Incoloy MA956, having a nominal composition of 74 weight percent iron, 20 percent chromium, 4.5 percent aluminum, 0.5 percent titanium, and 0.5 percent yttrium oxide particulate; Inconel alloy MA6000, having a composition of 69 percent nickel, 15 percent chromium, 4.0 percent tungsten, 2.0 percent molybdenum, 4.5 percent aluminum, 2.5 percent titanium, 2.0 percent tantalum, 0.05 percent carbon, 0.01 percent boron, 0.15 percent zirconium, and 1.1 percent yttrium oxide particulate; and Glidcop Al-15, composed of copper, with 0.15 percent particulate alumina. Suitable substrates may be any metals suitable for coating with a high strength, high hardness metal coating material, such as various bearing metals, iron alloys, stainless steels, nickel or cobalt superalloys, oxide dispersion strengthened alloys, etc.

It is to be understood that the above description of the present invention is subject to considerable modification, change, and adaptation by those skilled in the art, and that such modifications, changes, and adaptations are to be considered to be within the scope of the present invention, which is set forth by the appended claims.

What is claimed is:

1. A method for applying an oxide dispersion strengthened metal coating to a substrate, comprising the steps of:
   (a) positioning a laser spray apparatus over the substrate such that a laser in the spray apparatus forms a hot zone at a distance above the substrate sufficient to prevent the substrate from melting;
   (b) injecting an oxide dispersion strengthened metal powder coating material into the hot zone to heat the coating material such that it will be in a plastic state when it impinges against the substrate, wherein the coating material has an initial microstructure before it is injected into the hot zone; and
   (c) causing the coating material to impinge against the substrate to form a uniform coating on the substrate, wherein the micro structure of the coating on the substrate is substantially identical to the coating material's initial microstructure.

2. The method of claim 1, wherein the coating material comprises a nickel ally oxide dispersion strengthened with yttria.

3. The method of claim 2, wherein the coating material comprises 20 wt % Cr, 0.5 wt % Ti, 0.3 wt % Al, 0.6 wt % yttria, a maximum of 1.0 wt % Fe, balance Ni.

4. The method of claim 2, wherein the coating material comprises 15 wt % Cr, 4.0 wt % W, 2.0 wt % Mo, 4.5 wt % Al, 0.5 wt % Ti, 0.5 wt % yttria, balance Ni.

5. The method of claim 1, wherein the coating material comprises 20 wt % Cr, 4.5 wt % Al 0.5 wt % Ti, 0.5 wt % yttria, balance Fe.

6. The method of claim 1, wherein the coating material comprises 0.15 wt % alumina, balance Cu.

7. The method of claim 1, wherein the coating material is injected into the hot zone at a rate of about 8 grams per minute to about 20 grams per minute.

8. The method of claim 1, wherein the substrate is a metal selected from the group consisting of iron alloys, nickel superalloys, and cobalt superalloys.

9. The method of claim 1, wherein the substrate is a contact surface for use in a liquid oxygen/gaseous oxygen environment.

10. The method of claim 1, wherein the coating material is cooled at a rate of at least about $10^4$° F./sec after impinging against the substrate.

* * * * *